United States Patent [19]

Halpine

[11] Patent Number: 4,475,377
[45] Date of Patent: Oct. 9, 1984

[54] DOUBLE WALL METER PROVER

[75] Inventor: Joseph C. Halpine, Tulsa, Okla.

[73] Assignee: Measurement R & D Corporation, Houston, Tex.

[21] Appl. No.: 476,030

[22] Filed: Mar. 17, 1983

[51] Int. Cl.³ .............................................. G01F 25/00
[52] U.S. Cl. ............................................................ 73/3
[58] Field of Search ............................... 73/3; 138/114

[56] References Cited

U.S. PATENT DOCUMENTS 3,273,375  9/1966  Howe ............................................. 73/3
4,372,147  2/1983  Waugh et al. ............................. 73/3

Primary Examiner—S. Clement Swisher
Attorney, Agent, or Firm—Head, Johnson & Stevenson

[57] ABSTRACT

Apparatus for use in calibrating a meter having an outer tubular housing closed at each end, a reduced diameter and reduced length inner tubular barrel supported within the outer house providing an annular space between the exterior of the barrel and the interior of the housings, two spaced apart ports in the housing communicating with the annular area, an annular flange secured to the interior wall of the housing having an opening therein receiving the barrel and an annular flange between the exterior of the barrel and the interior of the housing—dividing the annular space into two portions, the annular flange being arranged so that the barrel may be easily and expeditiously removed while ensuring that no leakage occurs past the flange, a free piston in the barrel and piston detection switches spaced apart on the barrel providing means of indicating passage of precise amount of gas or liquid through the barrel.

9 Claims, 2 Drawing Figures

DOUBLE WALL METER PROVER

BRIEF SUMMARY OF THE INVENTION

A calibrating barrel for use in checking the accuracy of a meter employed to deliver gas or liquid, such as crude oil or natural gas, is provided. The calibrating barrel has an outer tubular housing closed at each end. Within the housing is a reduced diameter and reduced length inner tubular barrel which may be made of material such as fiberglass or stainless. An annulus is formed between the exterior of the barrel and the interior of the housing. Formed in the housing are two spaced apart ports communicating with the annular area. A flange is secured to the interior wall of the housing between the ports and has an opening therein slidably receiving the barrel. Secured to the exterior of the barrel is a flange which mates with the housing flange permitting the flanges to be secured together, such as by means of bolts, in a leakproof arrangement. The barrel is slidably supported within the housing. Positioned within the barrel is a free piston. Extending through the housing and in proximity with the barrel are piston detector switches. The housing has a removable cover at one end so that when the cover is removed the bolts securing the barrel flange to the internal housing flange may be removed, allowing the barrel to be expeditiously removed for service. The arrangement of the meter prover permits a barrel to be formed of material which does not have to resist pressure, and therefore, it may be made of non-metallic material or relatively thin metallic material, providing a very smooth surface for more accurate fluid measurements.

DETAILED DESCRIPTION

Figure 1:
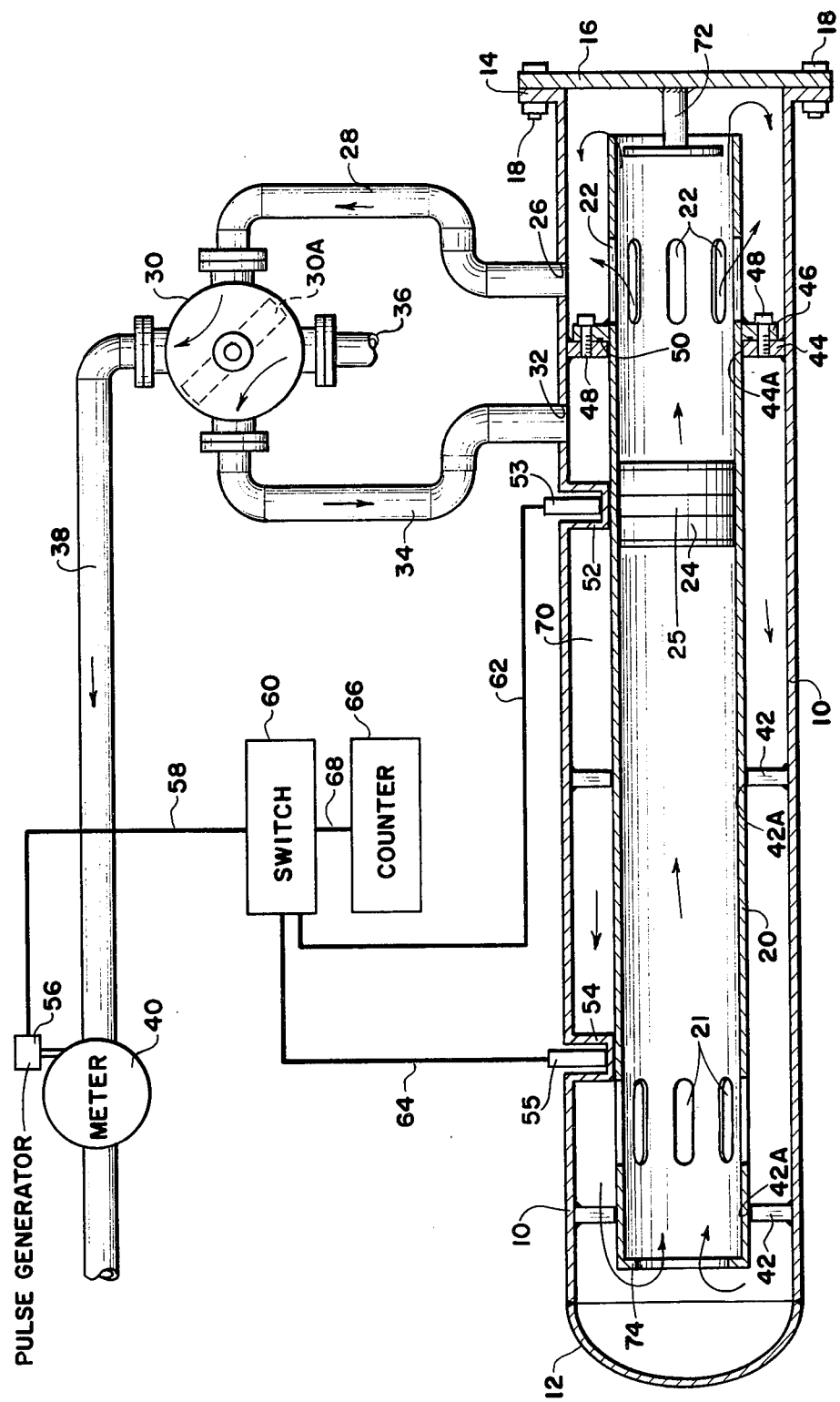
FIG. 1 shows an elevational view of a meter proving system employing the principles of this invention with the improved calibrating barrel shown in cross-section.

Most gas and liquids delivered in high volumes are measured for delivery by means of meters. An example is in the petroleum industry wherein crude oil produced from wells in a field is measured before delivery into a pipeline. In the early dates of the petroleum industry, crude petroleum was delivered into tanks. When a tank was filled or nearly filled, the depth was measured to provide an indication of the fluid volume and then the contents of the tank was delivered into a pipeline. This system required constant supervision and has been replaced by meter delivery systems in which the crude is passed through meters directly into the pipeline.

Since the value of crude petroleum is high and since large quantities are delivered, the accuracy of the measuring system is extremely important both to the buyer and the seller. It is imperative that effective means be provided to easily and periodically verify meter accuracy. For this purpose, meter proving devices have been developed, and the present invention is directed towards an improved meter prover.

A common means of proving meters is by the use of a precisely displaced volume in an elongated tubular measuring device; that is, a free piston moving in a pipe of known diameter and length and with means of measuring the exact length of travel of the piston as moved by the gas or liquid flowing through the system. An improvement on the standard piston type meter prover is exemplified in U.S. Pat. No. 3,273,375 issued to R. W. Howe on Sept. 20, 1966 for a "Flow Meter Calibrating Barrel". This patent shows a type of prover including an outer housing and an inner barrel which has significant advantages over other types of provers in that the inner barrel in which the piston operates to make measurements is surrounded by fluid and therefore is not subjected to high differential pressures and is insulated from atmosphere temperature changes. One problem with the meter prover of U.S. Pat. No. 3,273,375 is that it requires an inner wall to divide the annular area between the barrel and the housing into two flow channels, and such inner wall makes it difficult to remove and replace the inner barrel. The present invention is directed towards an important improvement in the subject matter of U.S. Pat. No. 3,273,375.

Referring to the drawing, the numeral 10 indicates an elongated tubular housing which is closed at one end by a welded-in-place end bell closure 12. At the other end of housing 10 is an external flange 14 which receives a cover 16 held in place with bolts 18.

Within the housing 10 is an elongated tubular barrel 20 which is of external diameter less than the internal diameter of housing 10 and of less length than housing 10. The barrel 20 is open at each end and has ports 21 and 22 adjacent the ends. Received in the barrel 20 is a free piston 24 which travels within the barrel in response to the direction of fluid flow and is not otherwise restrained in any way.

Connected to a first port 26 in housing 10 is a pipe 28 extending to a four-way valve 30. Connected to a second port 32 in housing 10 is piping 34 also connected to the four-way valve 30. Communicating with the four-way valve 30 is an inlet pipe 36 and outlet pipe 38 which is in series with meter 40.

The barrel 20 is supported within the interior of housing 10 by means of spaced apart guides 42 which may be in the form of internal flanges secured to the interior of the housing 10, the flanges having axial openings 42A therethrough. It is not necessary that barrel 20 fit openings 42A in a leakproof arrangement as flow of fluid through openings 42A does not affect the performance of the system.

There is provided between ports 26 and 32 an internal housing flange 44 having opening 44A therein of a diameter to slidably receive barrel 20. Flange 44 is supported in the housing 10 so that its periphery is leakproof with respect to the circumferential interior surface of the housing. Affixed to the exterior of barrel 20 is a barrel flange 46 having an external diameter less than the internal diameter of housing 10. The barrel flange 46 is in leakproof seal with the external surface of the barrel 20. Flanges 44 and 46 may be secured together such as by means of bolts 48. To ensure leakproof engagement, a gasket, such as an O-ring 50, is positioned between the abutting flanges 44 and 46.

The piston includes a circumferential magnet 25, or a circumferential steel ring, depending upon the type of proximity detectors employed, which will be described later.

Extending through the barrel 10 is a first piston detector switch cup 52 and spaced from it a second piston detector switch cup 54.

Each of the cups 52 and 54 have a bottom surface which is contiguous to the exterior surface of barrel 20, but the cups do not interfere with the removal or replacement of the barrel. Positioned in cup 52 is a first proximity detector 53; and in like manner, in cup 54 is a second proximity detector 55. Detectors 53 and 55 are actuated by the ring 25 on piston 24.

If ring 25 is magnetic, the detectors 53, 55 are of the type to respond to the close proximity of a magnetic switch, such as a reed switch or button switch. If ring 25 is of steel, the detectors will include magnetic means for responding to the proximity of the ring. The function of the switches is, as their name implies, to detect the presence of piston 24 as it passes back and forth within the barrel 20.

Meter 40 has a pulse generator 56 which provides a series of electrical pulses in direct proportion to the quantity of gas or fluid flowing through the meter. For instance, meter 90 may be arranged to provide 100 pulses for each gallon of fluid, or any other selected number. These electrical pulses are fed by conductor 58 to a switch 60. Conductors 62 and 64 connect piston detector switches 52 and 54 to switch 60. The output of the switch 60 is conveyed to a counter 66 by means of conductor 68.

The meter prover operates in the following manner: Fluid, such as crude petroleum, or natural gas, flows into pipe 36. The four-way valve 30 has a clapper 30A therein which is rotatable between two positions which are 90° apart. In the position illustrated, the clapper 30A deflects the fluid flowing into the valve from pipe 36 into pipe 34. The fluid enters the annular area 70 between the interior of the housing and the exterior of the barrel and flows in the direction indicated by the arrows. The fluid flows from left to right in the barrel 20, moving piston 24 with it, until the piston has passed ports 22 at the right-hand end of the barrel. A stop 72 keeps the piston 24 within the barrel but positions it such that fluid can flow freely out through ports 22.

In order to calibrate meter 30, and assuming piston 24 is at the right end of the barrel in contact with stop 72, the clapper 30A in valve 30 is rotated 90° in either direction. Counter 66 is set to zero. Fluid will flow through the barrel in the direction opposite that indicated by the arrows to move the piston 24 from the right to the left. When the piston ring actuates detector 53, a signal is sent to electronic switch 60 so that pulses from the meter are conveyed to and counted by the counter 66. When the piston ring 25 actuates the detector switch 53, a signal is sent to switch 60, stopping the meter count. Thus the count of meter 66 is reflective of the number of pulses generated by meter 40 as fluid of an exact amount determined by the internal diameter of barrel 20 and the length of travel of the piston as it moves from detector switch 53 to 55. When the barrel 24 is fully traveled from the right to the left end, it encounters stop 74 which is in the form of a circumferential ring secured to the interior diameter of barrel 20. Thereafter, fluid can flow continuously through the housing without moving the piston. To further calibrate the meter 40, the clapper 30A in valve 30 may be again rotated 90° reversing the direction of fluid flow and repeating the sequence so that a meter count can be obtained with the piston 24 moving both from right to left and left to right to help ensure the accuracy of the meter count.

The significance of the present invention is that it provides a means of expeditiously removing and replacing barrel 20. It can be seen that the accuracy of the system is dependent upon the uniformity of internal volume of barrel 20. The arrangement of the invention is such that the barrel 20 is not subjected to high fluid pressure but only to a very minimal fluid differentials, that is, the differential necessary to cause free piston 24 to move within the barrel which, in most instances, will be a fraction of a pound differential pressure between the interior of barrel 20 and the exterior. This means that the barrel 20 may be made of non-metallic material, such as fiberglass, or relatively thin metallic material, such as stainless steel, or any material having a low coefficient of friction, thereby ensuring unrestrained movement of piston 24. The barrel 20 may be completely fabricated and then inserted into the prover housing.

When it is necessary to replace or service the barrel 20, all that is required is that the bolts 18 be removed allowing the cover 46 to be taken from the end of housing 10. Next bolts 48 are removed and the barrel may then be slid out of the housing. When the barrel is removed, it carries with it the piston 24. The barrel can be inspected or the piston replaced to ensure continued measurement accuracy and the barrel positioned back within the housing.

It can be seen that the only requirement to ensure that no leakage past the barrel occurs is provided by the O-ring gasket 50 between the housing flange 44 and the barrel flange 46. The supports 42 do not have to be leakproof and supply only physical support for the barrel. Thus the invention as described herein provides an important improvement over the prior art such as exemplified in U.S. Pat. No. 3,273,375 previously noted and affords an arrangement wherein the meter proving barrel can be more expeditiously and efficiently utilized in a meter proving system.

Figure 2:
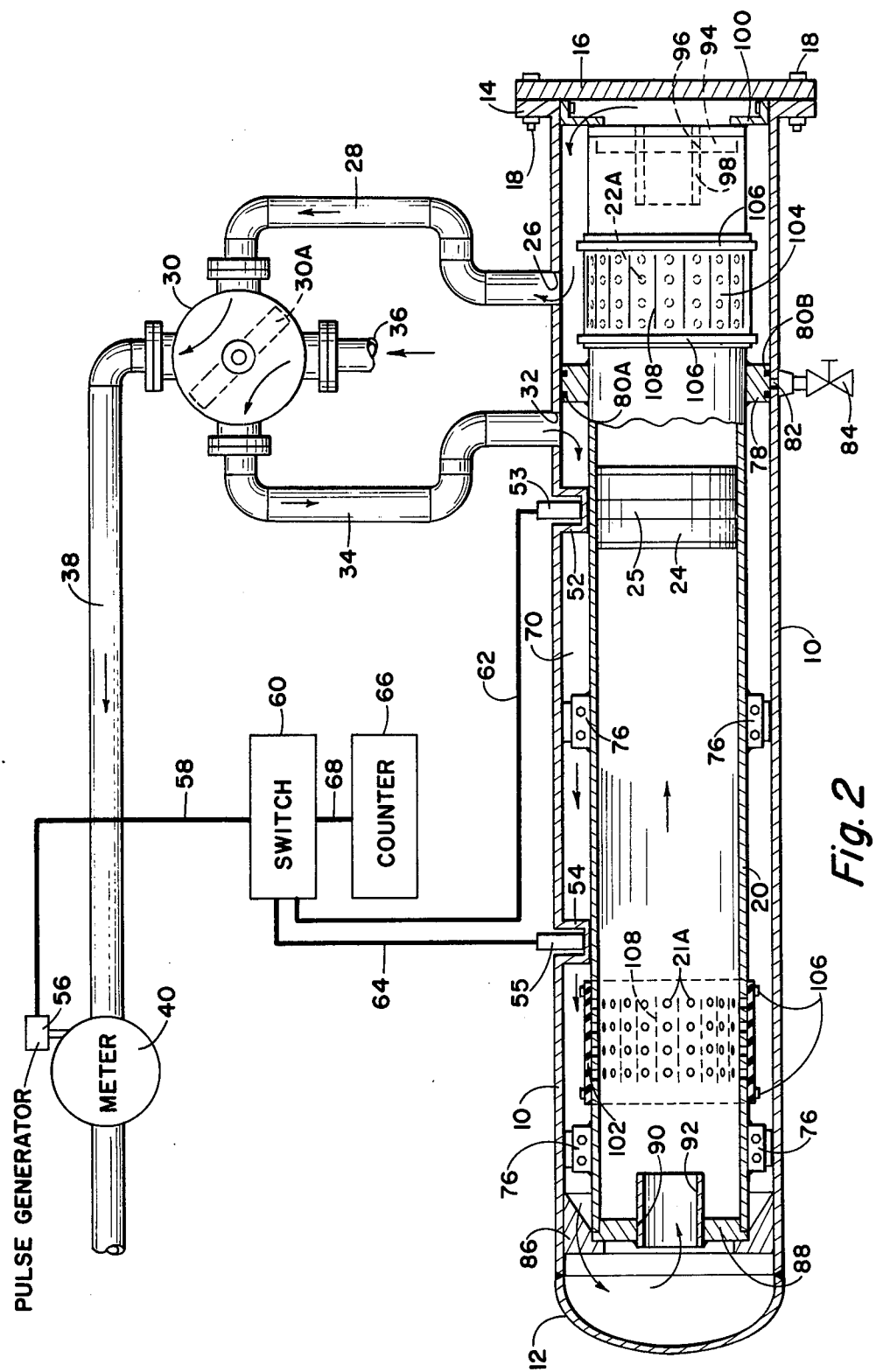
FIG. 2 is an elevational view shown partially in cross-section of an alternate embodiment of the invention, particularly showing the use of valve action sleeves on the barrel and means of checking against leakage of fluid from one section to the other within the housing.

Referring now to FIG. 2, an alternate embodiment of the invention is shown including some improvements. FIG. 2 shows various arrangements which simplify the construction, installation, and repair of the meter prover. Whereas in FIG. 1 the barrel 10 is bolted in position after it is inserted within the housing, FIG. 2 provides an arrangement wherein no bolting action is required. Support members 76 are spaced around the barrel 20 with the outer edges configured to engage the interior of housing 10 to hold the barrel 20 centrally positioned within the housing. A divider flange 78 extends around the entire external periphery of the barrel, and the outer periphery of the flange engages the entire internal circumferential surface of the housing 10 at a point between the fluid inlets 26 and 32. The divider flange 78 has two spaced apart continuous circumferential gaskets 80A and 80B providing a space between them. Communicating with the space between gaskets 80A and 80B is a port opening 82 formed in housing 10, the opening being closed by a valve 84. Flange 78 divides the interior of the housing 10 externally of the barrel 20 into a first annular portion which has communication with opening 26 and a second annular portion with opening 32.

In order for the meter prover to function with complete accuracy, no leakage of fluid externally of the barrel 20 can be permitted. By the provision of the spaced apart circumferential gaskets 80A and 80B and the port opening 82, means is provided for testing the efficacy of the gaskets to make sure leakage does not occur. It can be seen that if fluid leaks past either gasket 80A or 80B it will communicate with port 82. With valve 84 open, any leakage can be detected. Thus a means is provided for ensuring that when the barrel is inserted into the housing a complete leakproof arrangement is achieved and, therefore, the integrity of the meter proving system is enhanced. While only valve 84 is illustrated as having connection with opening 82, it can be seen that various other and more sophisticated leak detection systems may be employed, such as means to apply pressure to the area between the gaskets 80A and 80B with means to detect and signal any reduction in such pressure.

In order to ensure accurate positioning of the barrel 20 in the housing, an internally tapered flange 86 is secured within the housing 10 adjacent end 12. The internal flange 86 is configured to accurately receive the end of the barrel which is partially closed by an end plate 88. The end plate 88 has an opening 90 therein receiving a short tube 92. In like manner, the opposite end of the barrel has a plate 94 with an opening 96 receiving a short length of tube 98. Spacers 100 which may be affixed to the interior of the housing 10 as shown or to the plate 16, ensure accurate positioning of the barrel 20 within the housing.

Whereas in FIG. 1 slots were provided for the passage of fluid out of the barrel depending upon the position of piston 24, in FIG. 2 holes 21A and 22A are employed. The holes are arranged in series which are in planes of the longitudinal axis of the barrel. Positioned on the exterior of the barrel covering the holes 21A and 22A are elastomeric sleeves 102 and 104. Each of the sleeves fits around the exterior circumferential surface of the barrel 20, and each is held in place at the ends by circumferential clamps 106. The sleeves 102 and 104 are slit in the planes of the barrel longitudinal axis, the slits being indicated by the numeral 108. Thus, the sleeves 102 and 104 with the slits in them function in a check valve sense. They permit fluid to flow from within the barrel into the annular space within the housing but do not permit flow from the annular space into the interior of the barrel.

In the illustrated arrangement piston 24 is moving from left to right. This movement will cause it to engage tube 98. This will block flow through the tube. Fluid can then continue to flow uninterruptedly out through the openings 22A, expanding the sleeve 104, the fluid flowing through slits 108. When fluid flow is reversed and fluid enters the housing through opening 26, sleeve 104 will prevent flow of fluid through openings 22A and thereby force it to flow through tube 98. This will move the pistons 24 in the opposite direction; that is, from right to left. Thus, the function of the sleeves 102 and 104 is to ensure that when fluid flow reverses, the direction of movement of the piston will automatically reverse. At the same time, the sleeves assure that flow through the housing will never be impeded.

The arrangement of FIG. 2 thus provides improvements over the basic concept of FIG. 1 and illustrates that the actual embodiment of the invention may vary while, nevertheless, the principles of the invention are maintained.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A metering apparatus comprising:
   an elongated outer housing defining a closed interior surface;
   a reduced diameter and length inner tubular barrel supported within the housing providing an annular area between the exterior of the barrel and the housing interior surface;
   a first circumferential partition flange sealed at its outer periphery to the housing interior surface;
   a second circumferential partition flange sealed at its inner periphery to the exterior surface of said barrel, said first and second partition flanges when engaged with each other forming an annular wall dividing said annulus area into two portions;
   separate fluid ports in said housing communicating with each annular area portion;
   a piston in said barrel freely moveable by fluid flow through the barrel;
   first and second spaced apart detectors actuable by the passage of the piston as it moves in said barrel; and
   means of removably positioning said barrel within said housing and of sealably securing said first and second circumferential flanges to each other from said annular wall.

2. The metering apparatus according to claim 1 wherein said barrel is formed of plastic.

3. The metering apparatus according to claim 1 wherein said barrel is formed of fiberglass.

4. The metering apparatus according to claim 1 wherein said barrel is formed of thin metallic material.

5. A metering apparatus comprising:
   an elongated outer housing defining a closed interior surface;
   a reduced diameter and length inner tubular barrel removably supportable within said housing and providing an annular space between the exterior of the barrel and the interior surface of said housing;
   a piston in said barrel freely moveable by fluid flow through the barrel;
   first and second spaced apart detectors actuable by the passage of the piston as it moves in said barrel;
   an annular flange within said housing and interposed between the exterior of said barrel and the interior of said housing, said flange providing, when said barrel is within said housing, a sealed annular wall dividing said annular area into two portions;
   spaced apart annular gaskets on said flange providing an annular space therebetween;
   a small port in said barrel communicating with said annular space between said gaskets providing means of detecting leakage of fluid past either of said gaskets; and
   separate fluid ports in said housing by which fluid may be caused to flow by passage through said barrel.

6. A metering apparatus according to claim 5 in which at least an intermediate portion of said housing closed interior surface is cylindrical, and in which said flange is affixed to the exterior of said barrel, said gaskets being in the exterior circumferential surface of said flange, and sealably engaging said housing cylindrical interior portion when said tubular barrel having said flange thereon is positioned within said housing.

7. A metering apparatus comprising:

an elongated outer housing defining a closed interior surface;

a reduced diameter and length inner tubular barrel removably supported within said housing providing an annular space between the exterior of the barrel and the interior surface of said housing;

a piston in said barrel freely moveable by fluid flow through the barrel;

first and second spaced apart detectors actuable by the passage of said piston as it moves in said barrel;

a wall partitioning the annulus into two longitudinal portions, the housing having fluid ports therein communicating with each annular portion wherein fluid flowing into one port flows within one annular portion, through the barrel, and out the other port;

the barrel having at least one opening therein spaced adjacent to each end, the opening being on opposed sides of said partition wall; and check valve means closing said barrel openings permitting fluid flow from within the barrel through the openings but restricting fluid flow from the annular areas into the barrel.

8. A metering apparatus according to claim 7 wherein said check valve means includes relatively thin elastomeric members positioned on the exterior of said barrel covering said openings.

9. A metering apparatus according to claim 7 wherein said at least one opening adjacent each end of said barrel includes a plurality of openings oriented in the plane of the barrel longitudinal axis, and wherein said check valve means includes an elastomeric cylinder receiving said barrel and covering said plurality of openings, each end of said elastomeric cylinder being clamped to said barrel by circumferential clamp means, and said elastomeric cylinder having longitudinal slits therein in planes of the barrel axis, said slits being to either side of said plurality of openings.

* * * * *